US006150952A

United States Patent [19]

Priller et al.

[11] Patent Number: 6,150,952

[45] Date of Patent: Nov. 21, 2000

[54] SYSTEM WITH A LOCK AND A KEY WHICH COOPERATE ACCORDING TO THE TRANSPONDER PRINCIPLE, AS WELL AS A KEY AND A LOCK FOR SUCH A SYSTEM

[75] Inventors: Peter Priller; Martin Apschner; Werner Wiespointner; Heinz Kwas, all of Graz; Peter Schmallegger, Birkfeld; Christian Schwar, Graz, all of Austria

[73] Assignee: U.S. Philips Corporation, New York, N.Y.

[21] Appl. No.: 08/805,259

[22] Filed: Feb. 24, 1997

[30] Foreign Application Priority Data

Feb. 29, 1996 [EP] European Pat. Off. .............. 96200518

[51] Int. Cl.[7] ........................................ G06F 7/04

[52] U.S. Cl. ............................ 340/825.31; 340/825.69; 340/825.7; 70/278; 343/866; 343/867; 180/287

[58] Field of Search ................................ 340/10.1, 10.2, 340/10.3, 10.4, 10.5, 10.31–34, 10.41, 10.42, 10.51, 10.52, 10.6, 825.31, 825.54, 825.69, 825.72, 572.7, 572.8; 343/856, 742, 741, 895, 866, 873, 908, 817, 867; 342/44, 42, 51; 235/380–386, 449–450, 492–493; 70/278, 413, 278.1, 278.2, 278.3, 283.1, 252; 455/41

[56] References Cited

U.S. PATENT DOCUMENTS 4,980,680 12/1990 Knoll et al. ........................ 340/825.31

FOREIGN PATENT DOCUMENTS

0685620A1 6/1995 European Pat. Off. ........ E05B 49/00

9522475 8/1995 WIPO .

*Primary Examiner*—Michael Horabik

*Assistant Examiner*—William Bangachon

[57] ABSTRACT

A key and lock system has a key with an integrated transponder coil that is connected to a transponder unit, and a lock with an integrated write/read coil. The key has a key bit portion and a bow portion. When the key bit portion is inserted into an elongated aperture of a key cylinder of the lock, an axis of the write/read coil forms an acute angle with an axis of the transponder coil. The acute angle substantially differs from a zero degree angle.

13 Claims, 2 Drawing Sheets

SYSTEM WITH A LOCK AND A KEY WHICH COOPERATE ACCORDING TO THE TRANSPONDER PRINCIPLE, AS WELL AS A KEY AND A LOCK FOR SUCH A SYSTEM

BACKGROUND OF THE INVENTION

1. Field of the Invention

The invention relates to a system which includes a lock with a keyhole extending in a longitudinal direction in order to receive a key, and with a write/read device which is arranged to communicate with a transponder unit provided on a key, a write/read coil which is connected to the write/read device and has a coil axis, and also includes at least one key which can be inserted into the keyhole of the lock in a longitudinal direction of the key and is provided with a transponder unit arranged to communicate with the write/read device in the lock, and with a transponder coil which is connected to the transponder unit, has a coil axis and can be inductively coupled to the write/read coil.

The invention also relates to a key which can be inserted into a keyhole of a lock in a longitudinal direction of the key and is provided with a transponder unit which is arranged to communicate with a write/read device in a lock and with a transponder coil which is connected to the transponder unit, has a coil axis and can be inductively coupled to a write/read coil connected to a write/read device in a lock.

The invention also relates to a lock with a keyhole extending in a longitudinal direction in order to receive a key, and with a write/read device which is arranged to communicate with a transponder unit provided on a key, a write/read coil which is connected to the write/read device, has a coil axis and can be inductively coupled to a transponder coil on a key which is connected to a transponder unit on a key.

2. Description of the Related Art

A system of the kind described in the first paragraph, a key of the kind described in the second paragraph, and a lock of the kind described in the third paragraph are known, for example from the document EP 0 685 620 A1.

When the key has been inserted in the keyhole of the lock in the known system, the coil axis of the write/read coil and the coil axis of the transponder coil are exactly coaxially arranged, so that adequate inductive coupling, necessary to ensure perfect communication between the lock-side write/read device and the key-side transponder unit, exists only when the key has been inserted in the keyhole. This constitutes a limitation which is to be considered a drawback for many applications of a system in which a lock and a key cooperate according to the transponder principle.

SUMMARY OF THE INVENTION

It is an object of the invention to eliminate the above limitation and to provide a system with a lock and at least one key as well as a key and a lock which enable perfect communication between a lock-side write/read device and a key-side transponder unit not only when a key has been inserted into a keyhole. In order to achieve this object, when the key has been inserted into the keyhole in a system of the kind described in the first paragraph according to the invention, the write/read coil and the transponder coil occupy a position with respect to one another in which the coil axis of the write/read coil and the coil axis of the transponder coil enclose an acute angle.

By taking the steps according to the invention it is particularly simply achieved, substantially without using additional means, that adequate and satisfactory inductive coupling occurs between the lock-side write/read coil and the key-side transponder coil not only when a key has been inserted into the keyhole of a lock but also when the key has been withdrawn from the keyhole and is held, for example substantially transversely across the front of the keyhole, thus ensuring perfect communication between the lock-side write/read device and the key-side transponder unit. Because of the steps taken according to the invention, it is advantageously possible to test a code stored in a key-side transponder unit by means of a lock-side write/read device simply by holding the key transversely across the front of the keyhole of a lock of a system according to the invention, so that the operation of inserting the key into the keyhole can be omitted. In a system according to the invention which includes a lock which can be locked mechanically by means of a key as well as electromechanically by means of a transponder unit in a key which contains an authorization code for controlling the lock, the steps of the invention offer the advantage that for control of the electromechanically lockable lock a key provided with the transponder unit need only be held in front of the keyhole of the lock to activate the electromechanically lockable lock, and that the key must be physically introduced into the keyhole of the lock only to lock the lock if the electromechanical control of the lock fails.

It has been found that it is advantageous when in the system according to the invention the write/read coil on the lock occupies a position in which the coil axis of the write/read coil and the longitudinal direction of the hole enclose an acute angle. In such a system the position of the write/read coil can be situated in a comparatively wide range around the lock.

It has also been found that it is advantageous, however, when in a system according to the invention the transponder coil on the key occupies a position in which the coil axis of the transponder coil and the longitudinal direction of the key enclose an acute angle. It is thus achieved that, if desired, different angular positions can be chosen for the respective transponder coil in the case of different keys, thus enabling simple adaptation of the transmission or communication circumstances in the case of different conditions for the building of locks.

It has also been found that it is advantageous when in the systems according to the invention as described above the transponder coil is formed as an essentially ring-wise wound flat coil. This is advantageous with a view to achieving a large magnetically effective coil cross-section and hence suitable communication conditions.

In conjunction with the foregoing it has been found that it is advantageous when the transponder coil is formed as a rectangularly wound flat coil. Particularly good communication conditions are thus achieved.

It has also been found that it is advantageous when the key includes magnetic field deflection means which cooperate with the transponder coil and enable a magnetic field generated by the write/read coil and acting on the transponder coil to be deflected through the effective coil cross-section of the transponder coil. Such magnetic field deflection means enable attractive deflection and possibly concentration of the respective active magnetic field, resulting in particularly good inductive coupling.

It has also been found that it is very advantageous when the magnetic field deflection means are formed by a ferrite rod inserted through the transponder coil and traversing the effective coil cross-section. This is advantageous notably for achieving a simple and compact construction.

A key of the kind described in the second paragraph according to the invention is characterized in that the transponder coil on the key occupies a position in which the coil axis of the transponder coil and the longitudinal direction of the key enclose an acute angle. Such a key enables perfect communication between the transponder unit in the key and a lock-side read/write device when it has been inserted into a keyhole of a lock as well as when it is held transversely across the front of a keyhole.

It has been found that it is advantageous when in a key according to the invention the transponder coil is formed as an essentially ring-wise wound flat coil. Thus, a larger magnetically effective coil cross-section is achieved, benefiting suitable communication between a key-side transponder unit and a lock-side write/read device.

A very attractive embodiment of the above key is characterized in that the transponder coil is formed as a rectangularly wound flat coil. Thus, a particularly large magnetically effective coil cross-section is achieved, and hence also particularly attractive communication conditions.

For the keys in accordance with the invention it has also been found that it is advantageous when there are provided magnetic field deflection means which cooperate with the transponder coil and enable a magnetic field generated by a write/read coil and acting on the transponder coil to be deflected through the effective coil cross-section of the transponder coil. Such magnetic field deflection means enable attractive deflection and possibly concentration of the respective active magnetic field, resulting in particularly attractive inductive coupling and hence particularly good communication conditions.

It has also been found that the magnetic field deflection means are advantageously formed by a ferrite rod inserted through the transponder coil and traversing the effective coil cross-section. This is advantageous for achieving a particularly simple and compact construction.

A lock of the kind described in the third paragraph according to the invention is characterized in that the write/read coil on the lock occupies a position in which the coil axis of the write/read coil and the longitudinal direction of the hole enclose an acute angle. Such a lock offers the advantage that it can be controlled in conformity with the transponder principle when the key has been inserted into the keyhole of the lock as well as when it is held essentially transversely across the front of the keyhole. A lock of this kind also offers the advantage that the write/read coil can be arranged on the lock in a comparatively wide range of variation in respect of the angular position relative to the longitudinal direction of the hole, so that the transmission conditions between the write/read coil and a transponder coil of a key can be comparatively simply optimized.

These and other aspects of the invention will be apparent from and elucidated with reference to the embodiments described hereinafter.

BRIEF DESCRIPTION OF THE DRAWINGS

The invention will be described on the basis of three embodiments shown in the drawings, but the invention is by no means restricted thereto.

DESCRIPTION OF THE PREFERRED EMBODIMENTS

Figure 1:
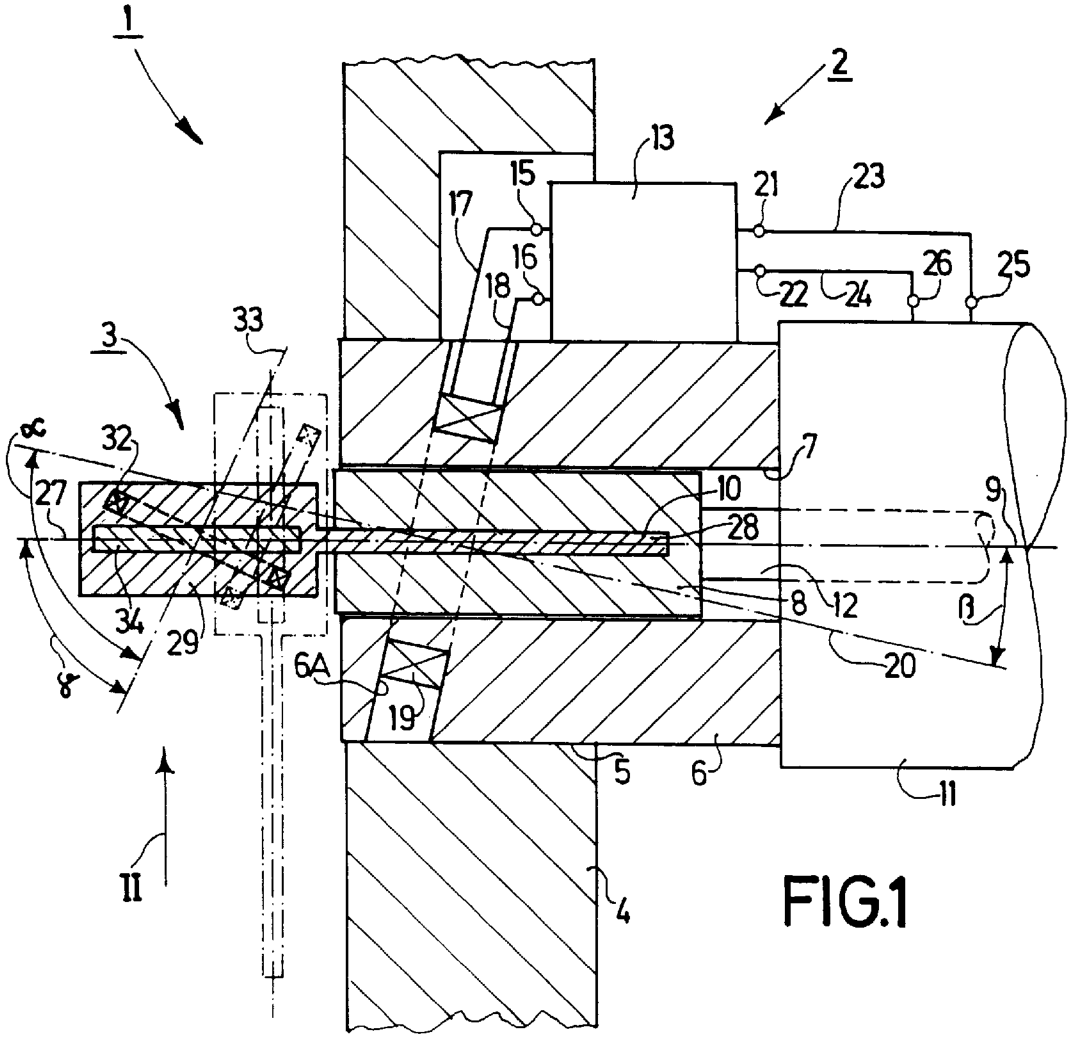
FIG. 1 is a diagrammatic plan view and a partly sectional view of a first embodiment of a system with a lock and a key according to the invention.

FIG. 1 shows a system 1 which consists of a lock 2 and a key 3.

The lock 2 is shown after having been built into a partition 4. The lock 2 includes a cylinder holder 6 which is inserted in a bore 5 in the partition 4 and is fixed therein in a manner not shown. A cylinder 8 of the lock 2 is mounted so that it can be turned in a bore 7 of the cylinder holder 6. In the cylinder 8 there is provided a keyhole 10 which extends in a longitudinal direction 9. The longitudinal direction 9 is denoted by a dash-dot line in FIG. 1.

The lock 2 of FIG. 1 is a lock which can be locked mechanically by means of the key 3 as well as electromechanically by means of a motor 11. To this end, a shaft 12 of the motor 11 is rigidly connected, for example by welding (not shown), to the cylinder 8 of the lock 2. For driving the motor 11 the lock 2 includes a diagrammatically reproduced write/read device 13 which forms part of a configuration operating according to the transponder principle. For said transponder principle reference is made, for example, to the document EP 0 473 569 B1 which describes such a transponder principle and whose teaching is incorporated herein by way of reference. The write/read device 13 is constructed so as to communicate with a transponder unit 14 which is provided in the key 3 and shown diagrammatically in FIG. 2. The write/read device 13 includes two terminals 15 and 16 and is electrically conductively connected, via leads 17 and 18 connected to the terminals 15 and 16, to a write/read coil 19 which has a coil axis 20 as denoted by a dash-dot line in FIG. 1. The write/read coil 19 is formed by a ring-shaped coil wound in a coil chamber 6A in the cylinder holder 6. The write/read device 13 includes two further terminals 21 and 22 which are connected, via leads 23 and 24, to two terminals 25 and 26 of the motor 11. The motor 11 can be driven by the write/read device 13 via the two leads 23 and 24, i.e. in such a manner that the motor 11 is driven so as to open the lock 2 when the write/read device 13 has detected that the transponder unit 14 communicating with the read/write device 13 contains a code which authorizes the opening of the lock 2 and has been transferred to the write/read device 13.

Figure 2:
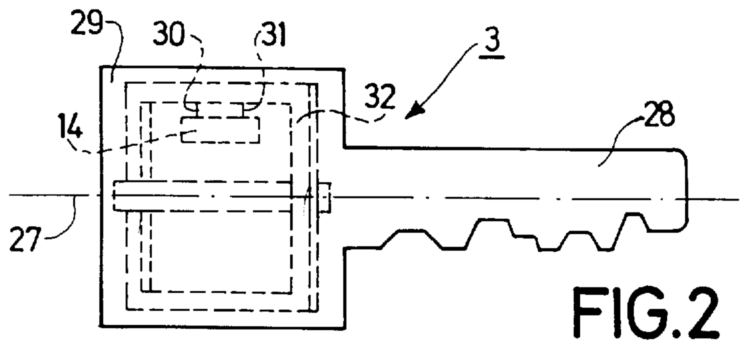
FIG. 2 is a side elevation, taken along the arrow II in FIG. 1, of a key of the system shown in FIG. 1.

The key 3 of the system 1 can be introduced into the keyhole 10 of the lock 2 in a longitudinal direction 27 of the key which is denoted by a dash-dot line in the FIGS. 1 and 2. FIG. 1 shows, in solid lines, the key 3 in its operating position in which it has been inserted in the lock 2. It is to be noted that the key 3 consists of a bit 28 which consists of metal and can be introduced into the keyhole 10 and a bow 29 which is connected to the bit 28, in a manner not shown, and consists of a synthetic material. In the bow of the key 3 there is provided the transponder unit 14, as shown diagrammatically in FIG. 2. Via two connection leads 30 and 31, the transponder unit 14 is electrically conductively connected to a transponder coil 32 which is accommodated in the bow 29, and has a coil axis 33 denoted by a dash-dot line in FIG. 1. The transponder coil 32 of the key 3 can be inductively coupled to the write/read coil 19 of the lock 2.

As can be readily seen in FIG. 1, in the present system 1 the construction is advantageously designed so that when the key 3 has been inserted in the keyhole 10, the read/write coil 19 and the transponder coil 32 occupy a position relative to one another in which the coil axis 20 of the write/read coil 19 and the coil axis 33 of the transponder coil 32 enclose an acute angle α. In other words, the two coil axes 20 and 33 do not enclose a right angle, so not an angle of 90°. The write/read coil 19 on the lock 2 then occupies a position in which the coil axis 20 of the write/read coil 19 and the longitudinal direction 9 of the hole enclose an acute angle β. It is also to be noted that the transponder coil 32 on the key 3 occupies a position in which the coil axis 33 of the transponder coil 32 and the longitudinal direction 27 of the key enclose an acute angle γ.

As can be readily seen in notably FIG. 2, the transponder coil 32 is formed by an essentially ring-wise wound flat coil. It is a special aspect of the transponder coil 32 that it is formed as a rectangularly wound flat coil. A transponder coil 32 having an optimum magnetically effective coil cross-section is thus obtained, being advantageous with a view to achieving suitable inductive coupling between the two coils 19 and 32, and hence good communication conditions between the write/read device 13 and the transponder unit 14.

The key 3 of the system 1 is also provided with magnetic field deflection means 34 whereby a magnetic field generated by the write/read coil 19 and acting on the transponder coil 32 can be deflected through the effective coil cross-section of the transponder coil 32. The magnetic field deflection means 34 are formed by a ferrite rod which has been inserted through the transponder coil 32 and traverses the effective coil cross-section of the transponder coil 32, resulting in a very simple and compact construction. The magnetic field deflection means 34 may also be formed by a curved ferrite rod, by a ferrite plate or by a rod or a plate of another magnetically active material. In the present embodiment the ferrite rod extends parallel to the longitudinal direction 27 of the key; however, this need not necessarily be so. The use of such a ferrite rod enables advantageous deflection and concentration of an active magnetic field, having a particularly positive effect on the inductive coupling between the write/read coil 19 and the transponder coil 32.

Because of the fact that the coil axes 20 and 33 enclose an acute angle α relative to one another when the key 3 has been inserted in the keyhole 10, in the system 1 it is achieved, not only when the key 3 has been inserted into the keyhole 10 as denoted by solid lines in the FIG. 1 but also when the key 3 is held essentially transversely across the front of the keyhole 10 as denoted by dash-dot lines in FIG. 1, that adequate inductive coupling exists between the write/read coil 19 and the transponder coil 32, occupying various relative positions with respect to the write/read coil 19 in dependence on the relative position of the key 3, so that in both of said relative positions of the key 3 with respect to the lock 2 perfect communication is ensured between the write/read device 13 in the lock 2 and the transponder unit 14 in the key 3. It is thus achieved that for the opening of the lock 2 the key 3 can either be inserted into the key receiving slit 10 of the lock 2 or be held in front of the lock 2; in both cases a perfect coupling in conformity with the transponder principle exists between the two coils 19 and 32, so that the write/read device 13 in the lock 2 can communicate with the transponder unit 14 in the key 3 and, after detection of a code authorizing the opening of the lock 2, drive the motor 11 accordingly via the leads 23 and 24, so that the cylinder 8 of the lock 2 is rotated by the motor 11 so as to open the lock 2. Should a disturbance or a defect occur in the lock 2 in its electromechanical mode of operation, for example in the motor 11 or in the write/read device 13, in the present case the lock 2 can still be opened by inserting the key 3 into the keyhole 10, the lock then being opened by turning the key 3 by hand.

It is also to be noted that in the case of a key 3 as shown in the FIGS. 1 and 2, the possibility of communication with the transponder unit 14 in the key 3 when the key 3 is held transversely across the front of a lock can also be utilized to test, for example, the access authorization of a bearer of the key for a site closed off by a lock that can be locked by means of the key 3. To this end, a lock-side write/read device can additionally cooperate with a visually readable display device on which an indication as regards approval or rejection of access is displayed after a key 3 has been held transversely across the front of the lock and the access authorization code stored in the transponder unit 14 of the key tested by the write/read device.

Figure 3:
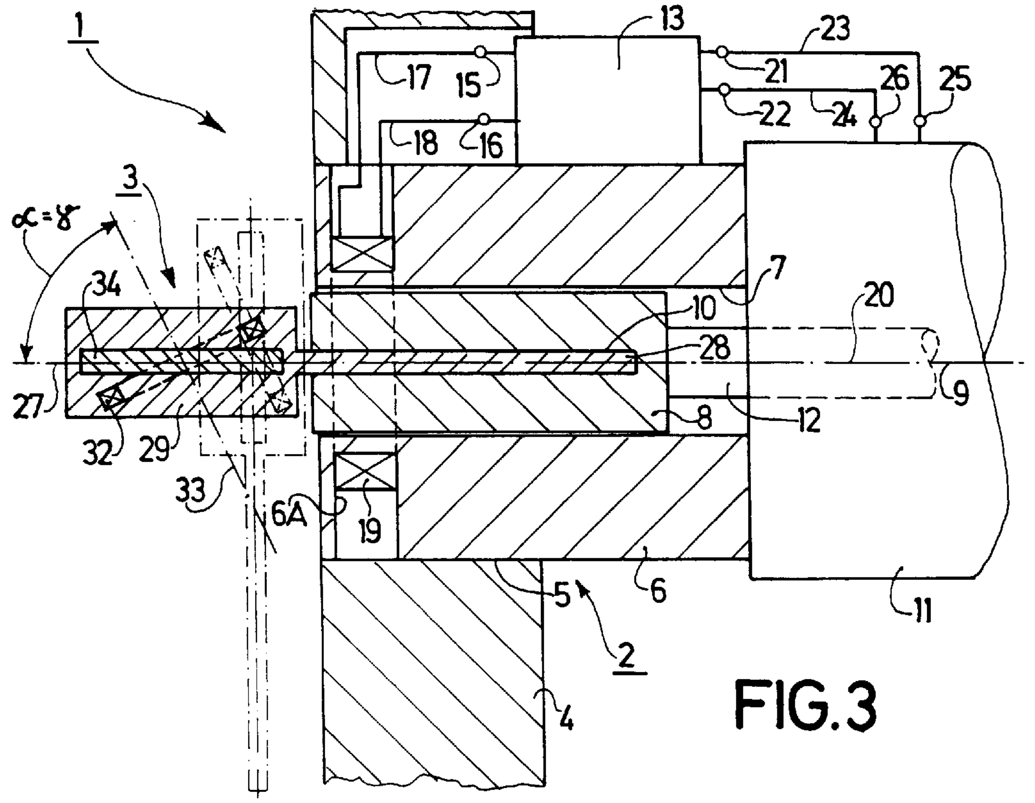
FIG. 3 shows, like FIG. 1, a second embodiment of a system with a lock and a key according to the invention.

A key 3 as shown in the FIGS. 1 and 2 also offers the advantage that when it is stored in a storage unit for a plurality of keys, that is to say in such a manner that the longitudinal direction 27 of the key extends parallel to a bearing surface in the storage unit, the transponder coil 32 provided in the key 3 according to the invention can be inductively coupled to a write/read coil provided in the storage unit, enabling a write/read device provided in the storage unit enables to detect and display the presence of the key 3, containing a given code in its transponder unit 14, in the storage unit. For example, it can thus be simply checked whether a given number of keys, for example all keys, have been stored in the storage unit. Such a step may be interesting, for example for a key-and-lock system in a hotel, an office building and the like. A key 3 as shown in the FIGS. 1 and 2, evidently, can also be used for other applications utilizing exclusively the transponder principle. When the key 3 has been inserted into the keyhole 10 in the system shown in FIG. 3, the write/read coil 19 and the transponder coil 32 again occupy such a position relative to one another that the coil axis 20 of the write/read coil 19 and the coil axis 33 of the transponder coil 32 enclose an acute angle α. In the system 1 of FIG. 3, however, the write/read coil 19 on the lock 22 occupies a position in which the coil axis 20 of the write/read coil 19 extends coaxially with the longitudinal direction 9 of the hole. The transponder coil 32 on the key 3 occupies a position, like in the system of FIG. 1, in which the coil axis 33 of the transponder coil 32 and the longitudinal direction 27 of the key enclose an acute angle γ which equals the angle αin the present case.

Figure 4:
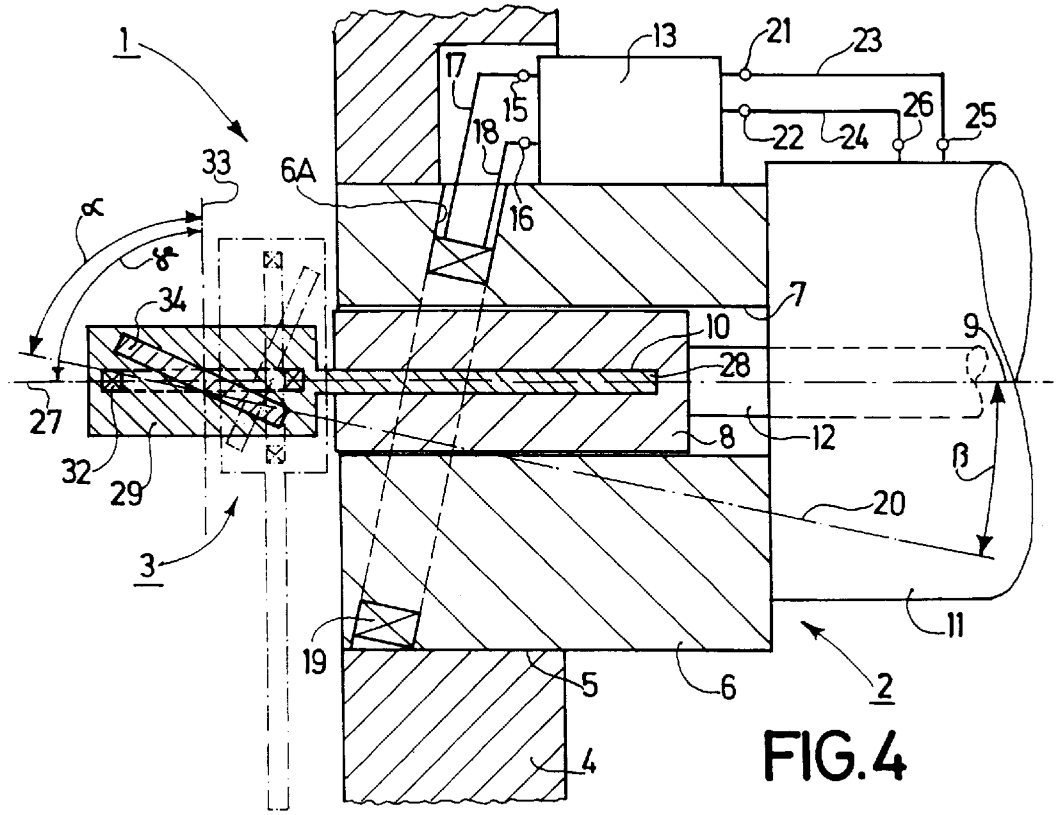
FIG. 4 shows, like the FIGS. 1 and 3, a third embodiment of a system with a lock and a key according to the invention.

When the key 3 has been inserted into the keyhole 10 in the system 1 shown in FIG. 4, the write/read coil 19 and the transponder coil 32 again occupy a relative position in which the coil axis 20 of the write/read coil 19 and the coil axis 33 of the transponder coil 32 enclose an acute angle α. The write/read coil 19 on the lock 2 then occupies a position in which the coil axis 20 of the write/read coil 19 and the longitudinal direction 9 of the hole enclose an acute angle β. The diameter of the write/read coil 19 in the system 1 shown in FIG. 4 is larger than that of the write/read coil 19 in the system 1 shown in FIG. 1 and in comparison with the write/read coil 19 of the system 1 shown in FIG. 1 the write/read coil 19 is now arranged so that its coil axis 20 is situated further from the write/read device 13. It is also to be noted that the transponder coil 32 on the key 3 occupies a position in which the coil axis 33 of the transponder coil 32 and the longitudinal direction 27 of the key enclose an angle γ formed as a right angle.

The invention is by no means not restricted to the three foregoing system embodiments. For example, instead of the ring-wise wound flat coils provided in the keys of the above three system embodiments helically wound cylinder coils can be used, as is known per se for a key disclosed in the cited document EP 0 685 620 A1. A helically wound cylinder coil can also be used in a lock according to the invention. It is also to be noted that the steps of the invention can also be used for locks of a construction other than in the above three embodiments. Furthermore, a system according to the invention may also involve two or more locks and a key according to the invention may also comprise, for example, two transponder units and hence also two transponder coils. All coils of the described embodiments are constructed essentially as flat coils which extend parallel to a coil plane oriented perpendicularly to their coil axis; if desired, however, coils may also be constructed so that two essentially equally large coil areas are formed, each of which extends parallel to one of two coil planes which enclose an angle with respect to one another, the coil axis then being situated essentially in the angular symmetry plane between the two coil planes.

What is claimed is:

1. A key and lock system comprising:

a key having a key bit portion and a bow portion, said bow portion comprising a transponder unit and a transponder coil which is coupled to said transponder unit, said transponder coil having a transponder coil axis perpendicular to a transponder coil surface defined by transponder coil windings;

a lock comprising a cylinder holder with a bore, and a key cylinder having an elongated aperture therein for receiving said key bit portion, said key cylinder being rotatably comprised in said cylinder holder, and said elongated aperture extending in a longitudinal direction perpendicular to an outer surface of said key cylinder, said lock further comprising a write/read coil inductively coupleable to said transponder coil through insertion of said key bit portion into said elongated aperture, said write/read coil having a write/read coil axis perpendicular to a write/read coil surface defined by write/read coil windings, and said write/read coil being arranged in said cylinder holder with said write/read coil windings surrounding said key cylinder, said write/read coil axis forming a first acute angle with said transponder coil axis when said key bit portion is inserted into said elongated aperture, said first acute angle substantially differing from a zero degree angle.

2. A key and lock system as claimed in claim 1, wherein said write/read coil axis forms a second acute angle with said longitudinal direction.

3. A key and lock system as claimed in claim 1, wherein said transponder axis forms a third acute angle with said longitudinal direction, said third acute angle substantially differing form a zero degree angle.

4. A key and lock system as claimed in claim 1, wherein said transponder coil is an essentially ring-wise wound flat coil.

5. A key and lock system as claimed in claim 1, wherein said transponder coil is a rectangularly wound flat coil.

6. A key and lock system as claimed in claim 1, wherein said key comprises magnetic field deflection means, cooperating with said transponder coil, for deflecting a magnetic field generated by said write/read coil and acting on said transponder coil, said deflected magnetic extending through said transponder coil surface.

7. A key and lock system as claimed in claim 6, wherein said magnetic field deflection means is a ferrite rod extending into said transponder coil through said transponder coil surface.

8. A key comprising:

a key bit portion and a bow portion, said bow portion comprising a transponder unit and a transponder coil which is coupled to said transponder unit, said transponder coil having a transponder coil axis perpendicular to a transponder coil surface defined by transponder coil windings, said key bit portion being insertable into a lock comprising a cylinder holder with a bore, and a key cylinder having an elongated aperture therein for receiving said key bit portion, said key cylinder being rotatably comprised in said cylinder holder, and said elongated aperture extending in a longitudinal direction perpendicular to an outer surface of said key cylinder, said lock further comprising a write/read coil inductively coupleable to said transponder coil through insertion of said key bit portion into said elongated aperture, said write/read coil having a write/read coil axis perpendicular to a write/read coil surface defined by write/read coil windings, and said write/read coil being arranged in said cylinder holder with said write/read coil windings surrounding said key cylinder, said write/read coil axis forming a first acute angle with said transponder coil axis when said key bit portion is inserted into said elongated aperture, said first acute angle substantially differing from a zero degree angle.

9. A key as claimed in claim 8, wherein said transponder coil is an essentially ring-wise wound flat coil.

10. A key as claimed in claim 8, wherein said transponder coil is a rectangularly wound flat coil.

11. A key as claimed in claim 8, wherein said key comprises magnetic field deflection means, cooperating with said transponder coil, for deflecting a magnetic field generated by said write/read coil and acting on said transponder coil, said deflected magnetic extending through said transponder coil surface.

12. A key as claimed in claim 11, wherein said magnetic field deflection means is a ferrite rod extending into said transponder coil through said transponder coil surface.

13. A lock arranged for receiving a key having a key bit portion and a bow portion, said bow portion comprising a transponder unit and a transponder coil which is coupled to said transponder unit, said transponder coil having a transponder coil axis perpendicular to a transponder coil surface defined by transponder coil windings, said lock comprising:

a cylinder holder with a bore, and a key cylinder having an elongated aperture therein for receiving said key bit portion, said key cylinder being rotatably comprised in said cylinder holder, and said elongated aperture extending in a longitudinal direction perpendicular to an outer surface of said key cylinder, said lock further comprising a write/read coil inductively coupleable to said transponder coil through insertion of said key bit portion into said elongated aperture, said write/read coil having a write/read coil axis perpendicular to a write/read coil surface defined by write/read coil windings, and said write/read coil being arranged in said cylinder holder with said write/read coil windings surrounding said key cylinder, said write/read coil axis forming a first acute angle with said transponder coil axis when said key bit portion is inserted into said elongated aperture, said first acute angle substantially differing from a zero degree angle.

* * * * *